United States Patent
Wu

(10) Patent No.: US 12,193,068 B2
(45) Date of Patent: Jan. 7, 2025

(54) ACCESS CONTROL METHOD AND DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 332 days.

(21) Appl. No.: 17/746,765

(22) Filed: May 17, 2022

(65) Prior Publication Data

US 2022/0279592 A1    Sep. 1, 2022

Related U.S. Application Data

(63) Continuation of application No. PCT/CN2020/129473, filed on Nov. 17, 2020.

(60) Provisional application No. 62/936,601, filed on Nov. 17, 2019.

(51) Int. Cl.
*H04W 74/0833* (2024.01)
*H04W 74/00* (2009.01)
*H04W 74/0808* (2024.01)

(52) U.S. Cl.
CPC ..... *H04W 74/0833* (2013.01); *H04W 74/004* (2013.01); *H04W 74/0808* (2013.01)

(58) Field of Classification Search
CPC ........... H04W 74/0833; H04W 74/004; H04W 74/0808; H04W 16/14
USPC ....................................................... 370/317
See application file for complete search history.

(56) References Cited

U.S. PATENT DOCUMENTS

| | | | | |
|---|---|---|---|---|
| 10,980,059 | B1* | 4/2021 | Babaei | H04W 76/19 |
| 2021/0352688 | A1* | 11/2021 | Luo | H04W 72/1268 |
| 2021/0352745 | A1* | 11/2021 | Yang | H04W 72/04 |
| 2022/0174751 | A1* | 6/2022 | Shin | H04L 1/1893 |
| 2022/0304076 | A1* | 9/2022 | Wang | H04W 72/02 |
| 2022/0377813 | A1* | 11/2022 | Wang | H04W 72/23 |

(Continued)

FOREIGN PATENT DOCUMENTS

| | | |
|---|---|---|
| WO | 2017140252 A1 | 8/2017 |
| WO | 2019215670 A1 | 11/2019 |

OTHER PUBLICATIONS

International Search Report issued in corresponding International Application No. PCT/CN2020/129473, mailed Feb. 20, 2021, 32 pages.

(Continued)

*Primary Examiner* — Kwang B Yao
*Assistant Examiner* — Syed M Bokhari
(74) *Attorney, Agent, or Firm* — BAYES PLLC

(57) ABSTRACT

Embodiments of the present disclosure provide an access control method and device. The method comprises: obtaining a RO resource for PRACH transmission and a PO resource for Msg A PUSCH transmission on the channel (Step S1001); determining a first channel access procedure for PRACH transmission and a second channel access procedure for Msg A PUSCH transmission (Step S1002), wherein the first channel access procedure comprises: a channel access procedure to initiate a first COT; or, a channel access procedure to share a second COT initiated by a network device, if the RO resource is within the second COT.

19 Claims, 4 Drawing Sheets

(56) References Cited

U.S. PATENT DOCUMENTS

2023/0132437 A1* 5/2023 Lei ................ H04L 5/0091
  370/329
2023/0247670 A1* 8/2023 Lee ................ H04L 1/1861
  370/329

OTHER PUBLICATIONS

Written Opinion of the International Searching Authority issued in corresponding International Application No. PCT/CN2020/129473, mailed Feb. 20, 2021, 5 pages.
"Discussion on the remaining issues of channel access procedure", Agenda Item: 7.2.2.2.1, Source: OPPO, 3GPP TSG RAN WG1 #101-E, R1-2004085, May 25-Jun. 5, 2020, 7 pages.
"On Channel Access Procedure", Agenda item: 7.2.2.2.1, Source: MediaTek Inc., 3GPP TSG RAN WG1 #96bis, R1-1904482, Xi'an, China, Apr. 8-12, 2019, 13 pages.
"Coexistence and channel access for NR unlicensed band operations", Agenda Item: 7.2.2.2.1, Source: Huawei, HiSilicon, 3GPP TSG RAN WG1 Meeting #98bis, R1-1910045, Chongqing, China, Oct. 14-20, 2019, 18 pages.
"LBT Impacts on 2-step RACH", Agenda Item: 6.2.1.3, Source: vivo, 3GPP TSG-RAN WG2 Meeting #107bis R2-1912179, Chongqing, China, Oct. 14-18, 2019, 3 pages.
Extended European Search Report issued in corresponding European application No. 20886790.3, mailed Nov. 3, 2022.
ZTE Corporation et al., "LBT aspects of MSGA transmission", R2-1914790, 3GPP RAN2#108 Reno, USA, Nov. 18-22, 2019.
Qualcomm Incorporated, "Other Consideration for Two-Step RACH", R1-1909241, 3GPP TSG-RAN WG1 Meeting #98 Prague, Czech Republic, Aug. 26-30, 2019.
Intel Corporation, "LBT impact on MsgA", R2-1914844, 3GPP TSG RAN WG2 #108 Reno, Nevada, USA, Nov. 18-22, 2019.

* cited by examiner

ACCESS CONTROL METHOD AND DEVICE

CROSS-REFERENCE TO RELATED APPLICATION

This is a continuation of International Application No. PCT/CN2020/129473, entitled "ACCESS CONTROL METHOD AND DEVICE" filed on Nov. 17, 2020, which claims the benefit of priority to U.S. Provisional Application No. 62/936,601, filed Nov. 17, 2019, both of which are incorporated herein by reference in their entireties.

TECHNICAL FIELD

The present disclosure relates to the field of wireless communication technologies, and more particularly, to an access control method and device.

BACKGROUND

The unlicensed spectrum is a shared spectrum. The communication equipment in different communication systems can use the spectrum as long as it meets the regulatory requirements set by the country or region on the spectrum, and does not need to apply for a proprietary spectrum authorization from the government.

In order to allow various communication systems that use unlicensed spectrum for wireless communication to coexist friendly in the spectrum, some countries or regions specify regulatory requirements that must be met to use unlicensed spectrum. For example, the communication device follows the principle of "Listen Before Talk (LBT)", that is, the device needs to perform channel sensing before transmitting the signal on the channel. Only when the LBT outcome shows that the channel is idle, the device can perform signal transmission; otherwise, the device cannot perform signal transmission. In order to ensure fairness, once a device successfully occupies the channel, the transmission duration cannot exceed the Maximum Channel Occupancy Time (MCOT).

On the unlicensed carrier, for the channel occupation time obtained by the base station, it may share the channel occupation time to the UE for transmitting the uplink signal or the uplink channel. In other words, when the base station shares its own channel occupancy time with the UE, the UE can use the LBT mode with higher priority than that used by the UE itself to obtain the channel, thereby obtaining the channel with greater probability.

For UL (uplink) and/or DL (downlink) transmission, LBT types include Type 1 and Type 2 channel access procedures.

In NR (New Radio) system, two random access procedures are adopted for a UE (User Equipment) to perform initial access. One is a 4-step RACH (Radom Access Channel) procedure and the other is a 2-step RACH procedure. The 4-step RACH procedure includes the transmission of random access preamble (Msg1) in a PRACH (Physical Random Access Channel), random access response (RAR) message with a PDCCH (Physical Downlink Control Channel)/PDSCH (Physical downlink shared channel) (Msg2), and when applicable, the transmission of a PUSCH (Physical Uplink Shared Channel) scheduled by a RAR UL grant, and PDSCH for contention resolution. The 2-step RACH procedure includes the transmission of random access preamble in a PRACH and of a PUSCH (MsgA) and the reception of a RAR message with a PDCCH/PDSCH (MsgB).

The 2-step RACH procedure is supported in the unlicensed spectrum. However, how to determine LBT type from UE side for the PRACH as well as PUSCH transmission during initial access procedure is not discussed.

The above information disclosed in this Background section is only for enhancement of understanding of the background of the disclosure and therefore it may contain information that does not form the prior art that is already known in this country to a person of ordinary skill in the art.

SUMMARY

The present disclosure provides an access control method and device.

In a first aspect, the present disclosure provides a method of accessing to a channel in shared spectrum, which may comprise obtaining a random access channel (RACH) occasion (RO) resource for physical random access channel (PRACH) transmission and a physical uplink shared channel (PUSCH) occasion (PO) resource for Message A (Msg A) PUSCH transmission on the channel; determining a first channel access procedure for PRACH transmission and a second channel access procedure for Msg A PUSCH transmission, wherein the first channel access procedure comprises: a channel access procedure to initiate a first channel occupancy time (COT); or, a channel access procedure to share a second COT initiated by a network device, if the RO resource is within the second COT.

In a second aspect, the present disclosure provides a terminal, which may comprise an obtaining unit configured to obtain a RO resource for PRACH transmission and a PO resource for Msg A PUSCH transmission on a channel; a determining unit configured to determine a first channel access procedure for PRACH transmission and a second channel access procedure for Msg A PUSCH transmission, wherein the first channel access procedure comprises: a channel access procedure to initiate a first COT; or, a channel access procedure to share a second COT initiated by a network device, if the RO resource is within the second COT.

In a third aspect, the present disclosure provides a terminal device for performing the method in the above first aspect or any of the possible implementations of the first aspect. In particular, the terminal device includes functional modules for performing the method in the above first aspect or any of the possible implementations of the first aspect.

In a fourth aspect, the present disclosure provides a terminal device, including a processor and a memory; wherein the memory is configured to store instructions executable by the processor and the processor is configured to perform the method in the above first aspect or any of the possible implementations of the first aspect.

In a fifth aspect, the present disclosure provides a computer readable medium for storing computer programs, which include instructions for executing the above first aspect or any of the possible implementations of the first aspect.

In a sixth aspect, the present disclosure provides a computer program product including a non-transitory computer-readable storage medium storing a computer program, wherein the computer program is executable to cause a computer to perform the method in the above first aspect or any of the possible implementations of the first aspect.

This section provides a summary of various implementations or examples of the technology described in the disclosure, however, it is not a comprehensive disclosure of the full scope or all features of the disclosed technology.

BRIEF DESCRIPTION OF THE DRAWINGS

To describe the technical solutions in the embodiments of the present disclosure more clearly, the following will briefly introduce the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
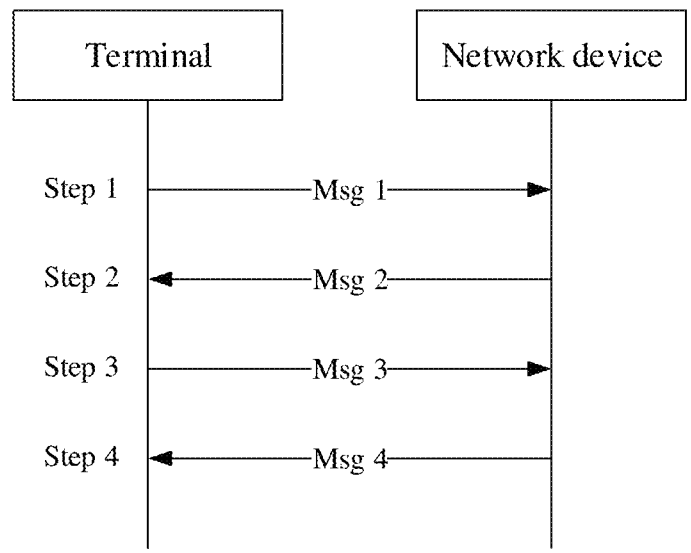
FIG. 1 illustrates an example of a 4-step RACH procedure.

Exemplary embodiments of the disclosure will now be described more fully with reference to the accompanying drawings, in which exemplary embodiments are shown. Exemplary embodiments of the disclosure may, however, be embodied in many different forms and should not be construed as being limited to the embodiments set forth herein; rather, these embodiments are provided so that this disclosure will be thorough and complete, and will fully convey the concept of exemplary embodiments to those skilled in the art. In the drawings, the thicknesses of layers and regions are exaggerated for clarity. Like reference numerals in the drawings denote like elements, and thus their description will be omitted.

The described features, structures, or/and characteristics of the disclosure may be combined in any suitable manner in one or more embodiments. In the following description, numerous specific details are disclosed to provide a thorough understanding of embodiments of the disclosure. One skilled in the relevant art will recognize, however, that the disclosure may be practiced without one or more of the specific details, or with other methods, components and so forth. In other instances, well-known structures, materials, or operations are not shown or described in detail to avoid obscuring aspects of the disclosure.

With reference to the accompanying drawings, an access control method and equipment provided by the embodiments of the present disclosure will be specifically described below.

It is to be understood that the technical solutions of the present disclosure may be used in various wireless communication systems, for example, Global System of Mobile communication (GSM), General Packet Radio Service (GPRS), Wideband Code Division Multiple Access (WCDMA), High-Speed Packet Access (HSPA), LTE, LTE-Advanced (LTE-A), New Radio (NR) and so on. Furthermore, the communication between a terminal and a network device in the wireless communication network may be performed according to any suitable generation communication protocols, including, but not limited to, the second generation (2G), 2.5G, 2.75G, the third generation (3G), the fourth generation (4G), 4.5G, the fifth generation (5G) communication protocols, and/or any other protocols either currently known or to be developed in the future.

It is to be understood that the term "terminal" refers to any end device that can access a wireless communication network and receive services therefrom. The terminal may include user equipment (UE), which is also referred to as a mobile terminal or mobile user equipment and so on. The user equipment may be a mobile terminal such as a mobile telephone (also referred to as a cellular telephone) or a computer having a mobile terminal such as portable, pocket, hand-held, vehicle-mounted mobile apparatuses or a mobile apparatus with a built-in computer.

It is to be understood that the term "network device" refers to a device in a wireless communication network via which a terminal accesses the network and receives services therefrom. The network device may include a base station (BS), an access point (AP), a Mobile Management Entity (MME), a Multi-cell/Multicast Coordination Entity (MCE), a Access and Mobility Management Function (AMF)/User Plane Function (UPF), a gateway, a server, a controller or any other suitable device in the wireless communication network. The BS may be, for example, a base transceiver station (BTS) in the GSM or the CDMA, or may be a Node B in the WCDMA, or may be an evolutional Node B (eNB or e-NodeB) in the LTE or the LTE-A, or may be a gNB or ng-eNB in the NR, and the present disclosure is not limited thereto.

As mentioned above, to solve the identified problems, LBT types, which are also called as channel access procedures and RACH procedures for initial access shall be introduced.

For UL and/or DL transmission, LBT types include Type 1 and Type 2 channel access procedures.

Take UL transmission as an example, a UE may transmit the transmission using Type 1 channel access procedure after first sensing the channel to be idle during the slot durations of a defer duration $T_d$; and after the counter N is zero in step 4. The counter N is adjusted by sensing the channel for additional slot duration(s) according to the steps described below.

1) set $N=N_{init}$, where $N_{init}$ is a random number uniformly distributed between 0 and $CW_p$, and go to step 4;
2) if N>0 and the UE chooses to decrement the counter, set N=N−1;
3) sense the channel for an additional slot duration, and if the additional slot duration is idle, go to step 4; else, go to step 5;
4) if N=0, stop; else, go to step 2.
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to step 4; else, go to step 5.

If a UE has not transmitted a UL transmission on a channel on which UL transmission(s) are performed after step 4 in the procedure above, the UE may transmit a transmission on the channel, if the channel is sensed to be idle at least in a sensing slot duration $T_{sl}$ when the UE is ready to transmit the transmission and if the channel has been sensed to be idle during all the slot durations of a defer duration $T_d$ immediately before the transmission. If the channel has not been sensed to be idle in a sensing slot duration $T_{sl}$ when the UE first senses the channel after it is ready to transmit, or if the channel has not been sensed to be idle during any of the sensing slot durations of a defer duration $T_d$ immediately before the intended transmission, the UE proceeds to step 1 after sensing the channel to be idle during the slot durations of a defer duration $T_d$.

The defer duration $T_d$ consists of duration $T_f=16$ us immediately followed by $m_p$ consecutive slot durations where each slot duration is $T_{sl}=9$ us, and $T_f$ includes an idle slot duration $T_{sl}$ at start of $T_f$.

$CW_{min,p} \leq CW_p \leq CW_{max,p}$ is the contention window.

$CW_{min,p}$ and $CW_{max,p}$ are chosen before step 1 of the procedure above.

$m_p$, $CW_{min,p}$, and $CW_{max,p}$ are based on a channel access priority class p (CAPC p) as shown in Table 1.

TABLE 1

Channel Access Priority Class for UL

| Channel Access Priority Class (p) | $m_p$ | $CW_{min,p}$ | $CW_{max,p}$ | $T_{ulm\ cot,p}$ | Allowed $CW_p$ Sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulm\ cot,p}$ = 10 ms if the higher layer parameter absenceOfAnyOtherTechnology-r14 or absenceOfAnyOtherTechnology-r16 is provided, otherwise, $T_{ulm\ cot,p}$ = 6 ms.

NOTE 2:
When $T_{ulm\ cot,p}$ = 6 ms it may be increased to 8 ms by inserting one or more gaps. The minimum duration of a gap shall be 100 us. The maximum duration before including any such gap shall be 6 ms.

Type 2 channel access procedures can further include at least one of: Type 2A channel access procedure, Type 2B channel access procedure and Type 2C channel access procedure.

If a UE is supposed to perform Type 2A UL channel access procedures, the UE uses Type 2A UL channel access procedure for a UL transmission. The UE may transmit the transmission immediately after sensing the channel to be idle for at least a sensing interval $T_{short\_ul}=25$ us. $T_{short\_ul}$ consists of a duration $T_f=16$ us immediately followed by one slot duration $T_{sl}=9$ us and $T_f$ includes an idle slot duration $T_{sl}$ at start of $T_f$. The channel is considered to be idle for $T_{short\_ul}$ if it is sensed to be idle during the slot durations of $T_{short\_ul}$. For Type 2A UL channel access procedures, the sensing interval is supposed to be 25 us.

If a UE is supposed to perform Type 2B UL channel access procedures, the UE uses Type 2B UL channel access procedure for a UL transmission. The UE may transmit the transmission immediately after sensing the channel to be idle. For Type 2B UL channel access procedures, the sensing interval is supposed to be 16 us.

If a UE is supposed to perform Type 2C UL channel access procedures, the UE does not sense the channel before transmission. For Type 2C UL channel access procedures, the sensing interval is supposed to be up to 16 us.

In NR (New Radio) system, a 4-step RACH procedure is adopted for a UE to perform initial access, as shown in FIG. 1, which includes:

Step 1: the UE transmits PRACH sequence on a RACH Occasion (or Msg 1, message 1);

Step 2: the gNB transmits the corresponding Random Access Response (RAR, or Msg 2) after detecting the UE's Msg 1. The RAR also includes RAR grant to schedule the UE to transmit Msg 3;

Step 3: the UE transmits Msg 3 according to received RAR grant in Step 2;

Step 4: Contention resolution. The UE may assume RACH procedure is complete after successfully received Msg 4 from the gNB.

Figure 2:
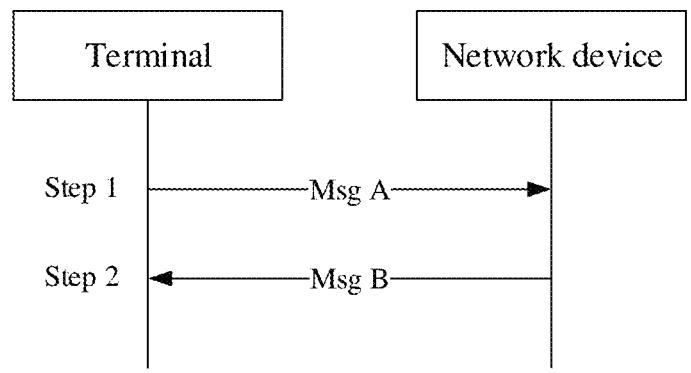
FIG. 2 illustrates an example of a 2-step RACH procedure.

For enhancement, a 2-step RACH procedure is adopted in NR to reduce access delay for a UE to perform initial access, as shown in FIG. 2, which includes:

Step 1: the UE transmits a message (Msg A), or the UE transmits PRACH sequence on a RACH Occasion (RO) and PUSCH on a PUSCH Occasion (PO). This step is similar to combine Step 1 and Step 3 in the 4-step RACH procedure together. Msg A includes a PRACH transmission and a PUSCH transmission, the PUSCH in Msg A can be called as Msg A PUSCH.

Step 2: the gNB transmits the corresponding Random Access Response (or Msg B) which may contain contention resolution for UE. This step is similar to combine Step 2 and Step 4 in the 4-step RACH procedure together. The UE may assume RACH procedure is complete after successfully received Msg B from the gNB.

The embodiments of the present disclosure include at least parts of the following contents.

In a 2-step RACH procedure, a UE may determine channel access procedure for Msg A transmission according to the relationship between a RO (RACH Occasion, which is used to transmit PRACH) resource and a PO (PUSCH Occasion, which is used to transmit PUSCH) resource, and/or whether the RO resource is within a gNB's COT (Channel Occupancy Time), and/or whether the PO resource is within a gNB's COT.

Example 1

Figure 3:
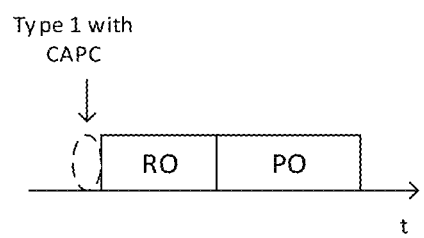
FIG. 3 schematically illustrates an example of relations between RACH occasion resource and PUSCH occasion resource.

The RO resource and the PO resource are contiguous in time domain within the same LBT subband. In this case, at least one of the following can be considered:
  UE may use Type 1 channel access procedure for transmissions on the RO resource and the PO resource that initiate a channel occupancy with UL CAPC p.
    Optionally, CAPC p=1 in Table 1.
  If UE determines the RO resource and/or the PO resource are within a channel occupancy initiated by gNB, the UE may use Type 2 channel access procedure for transmissions on the RO resource and/or the PO resource.
    Optionally, if the gap between the starting point of the RO resource and the ending point of the previous transmission (e.g., gNB's DL transmission) is up to 16 us, the UE may use Type 2C channel access procedure for transmissions on the RO resource and/or the PO resource.
    Optionally, if the gap between the starting point of the RO resource and the ending point of the previous transmission (e.g., gNB's DL transmission) is more than or equal to 16 us but less than 25 us, the UE may use Type 2B channel access procedure for transmissions on the RO resource and/or the PO resource.
    Optionally, if the gap between the starting point of the RO resource and the ending point of the previous transmission (e.g., gNB's DL transmission) is more than or equal to 25 us, the UE may use Type 2A channel access procedure for transmissions on the RO resource and/or the PO resource.
  One example is as FIG. 3 shown.

Example 2

Figure 4:
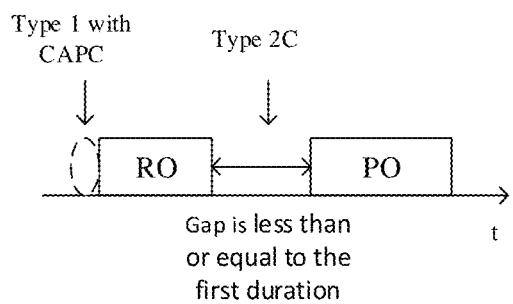
FIG. 4 schematically illustrates another example of relations between RACH occasion resource and PUSCH occasion resource.

The RO resource and the PO resource are separated by a gap of less than or equal to 16 us in time domain within the same LBT subband. In this case, at least one of the following can be considered:
  UE may use Type 1 channel access procedure for transmission on the RO resource that initiate a channel occupancy with UL CAPC p, and/or, UE may use Type 2C channel access procedure for transmission on the PO resource.
    Optionally, CAPC p=1 in Table 1.
  If UE determines the RO resource and/or the PO resource are within a channel occupancy initiated by gNB, the UE may use Type 2 channel access procedure for transmissions on the RO resource and/or the PO resource.
    Optionally, if the gap between the starting point of the RO resource and the ending point of the previous transmission (e.g., gNB's DL transmission) is up to 16 us, the UE may use Type 2C channel access procedure for transmissions on the RO resource and/or the PO resource.
    Optionally, if the gap between the starting point of the RO resource and the ending point of the previous transmission (e.g., gNB's DL transmission) is more than or equal to 16 us but less than 25 us, the UE may use Type 2B channel access procedure for transmissions on the RO resource and/or the PO resource.
    Optionally, if the gap between the starting point of the RO resource and the ending point of the previous transmission (e.g., gNB's DL transmission) is more than or equal to 25 us, the UE may use Type 2A channel access procedure for transmissions on the RO resource and/or the PO resource.
  If UE determines the PO resource is within a channel occupancy initiated by gNB, the UE may use Type 2 channel access procedure for transmissions on the PO resource.
    Optionally, since the gap between the starting point of the PO resource and the ending point of the RO resource is up to 16 us, the UE may use Type 2C channel access procedure for transmissions on the PO resource.
  One example is as FIG. 4 shown.

Example 3

Figure 5:
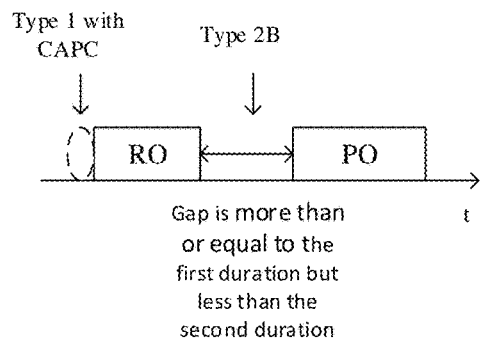
FIG. 5 schematically illustrates another example of relations between RACH occasion resource and PUSCH occasion resource.

The RO resource and the PO resource are separated by a gap of more than or equal to 16 us but less than 25 us in time domain within the same LBT subband. In this case, at least one of the following can be considered:
  UE may use Type 1 channel access procedure for transmission on the RO resource that initiate a channel occupancy with UL CAPC p, and/or, UE may use Type 2B channel access procedure for transmission on the PO resource.
    Optionally, CAPC p=1 in Table 1.
  If UE determines the RO resource and/or the PO resource are within a channel occupancy initiated by gNB, the UE may use Type 2 channel access procedure for transmissions on the RO resource and/or the PO resource.
    Optionally, if the gap between the starting point of the RO resource and the ending point of the previous transmission (e.g., gNB's DL transmission) is up to 16 us, the UE may use Type 2C channel access procedure for transmissions on the RO resource and/or the PO resource.
    Optionally, if the gap between the starting point of the RO resource and the ending point of the previous transmission (e.g., gNB's DL transmission) is more than or equal to 16 us but less than 25 us, the UE may use Type 2B channel access procedure for transmissions on the RO resource and/or the PO resource.
    Optionally, if the gap between the starting point of the RO resource and the ending point of the previous transmission (e.g., gNB's DL transmission) is more than or equal to 25 us, the UE may use Type 2A channel access procedure for transmissions on the RO resource and/or the PO resource.
  If UE determines the PO resource is within a channel occupancy initiated by gNB, the UE may use Type 2 channel access procedure for transmissions on the PO resource.
    Optionally, since the gap between the starting point of the PO resource and the ending point of the RO resource is more than or equal to 16 us but less than 25 us, the UE may use Type 2B channel access procedure for transmissions on the PO resource.
  One example is as FIG. 5 shown.

Example 4

The RO resource and the PO resource are separated by a gap of more than or equal to 25 us but less than or equal to a first threshold value in time domain within the same LBT subband. In this case, at least one of the following can be considered:

UE may use Type 1 channel access procedure for transmission on the RO resource that initiate a channel occupancy with UL CAPC p, and/or, UE may use Type 2A channel access procedure for transmission on the PO resource.

Optionally, CAPC p=1 in Table 1.

Optionally, the first threshold value is determined by at least one of the following: the symbol length of the RO resource, the symbol length of PO resource, the MCOT corresponding to CAPC p.

The first threshold value=the MCOT-the symbol length of the RO resource-the symbol length of PO resource For example, p=1, the MCOT is 2 ms, assume the symbol length of the RO resource is 0.5 ms, the symbol length of PO resource is 0.5 ms, then the first threshold value is 1 ms.

Optionally, the first threshold value is 2 ms.

If UE determines the RO resource and/or the PO resource are within a channel occupancy initiated by gNB, the UE may use Type 2 channel access procedure for transmissions on the RO resource and/or the PO resource.

Optionally, if the gap between the starting point of the RO resource and the ending point of the previous transmission (e.g., gNB's DL transmission) is up to 16 us, the UE may use Type 2C channel access procedure for transmissions on the RO resource and/or the PO resource.

Optionally, if the gap between the starting point of the RO resource and the ending point of the previous transmission (e.g., gNB's DL transmission) is more than or equal to 16 us but less than 25 us, the UE may use Type 2B channel access procedure for transmissions on the RO resource and/or the PO resource.

Optionally, if the gap between the starting point of the RO resource and the ending point of the previous transmission (e.g., gNB's DL transmission) is more than or equal to 25 us, the UE may use Type 2A channel access procedure for transmissions on the RO resource and/or the PO resource.

If UE determines the PO resource is within a channel occupancy initiated by gNB, the UE may use Type 2 channel access procedure for transmissions on the PO resource.

Optionally, since the gap between the starting point of the PO resource and the ending point of the RO resource is more than or equal to 25 us but less than or equal to the first threshold value, the UE may use Type 2A channel access procedure for transmissions on the PO resource.

Figure 6:
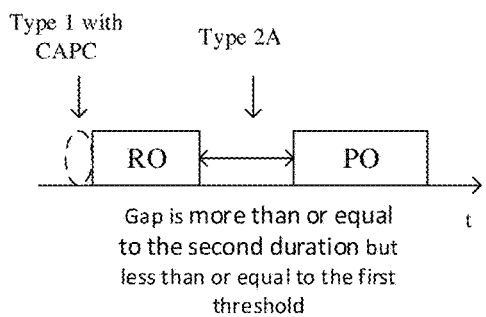
FIG. 6 schematically illustrates another example of relations between RACH occasion resource and PUSCH occasion resource.

One example is as FIG. 6 shown.

Example 5

The RO resource and the PO resource are separated by a gap of more than a second threshold value in time domain within the same LBT subband, and/or, the RO resource and the PO resource are located in the different LBT subband. In those cases, at least one of the following can be considered:

UE may use Type 1 channel access procedure for transmission on the RO resource that initiate a channel occupancy with UL CAPC p1, and/or, UE may use Type 1 channel access procedure for transmission on the PO resource that initiate a channel occupancy with UL CAPC p2.

Optionally, CAPC p1=1 in Table 1.

Optionally, CAPC p2=1 in Table 1.

Optionally, CAPC p2 is determined based on the service trigger PRACH transmission.

Optionally, p1≤p2.

Optionally, the second threshold value is determined by at least one of the following: the symbol length of the RO resource, the symbol length of PO resource, the MCOT corresponding to CAPC p.

The second threshold value=the MCOT-the symbol length of the RO resource-the symbol length of PO resource For example, p=1, the MCOT is 2 ms, assume the symbol length of the RO resource is 0.5 ms, the symbol length of PO resource is 0.5 ms, then the second threshold value is 1 ms.

Optionally, the second threshold value is 1 ms or 2 ms.

Optionally, the second threshold value is the same value as the first threshold value in Example 4.

If UE determines the RO resource and/or the PO resource are within a channel occupancy initiated by gNB, the UE may use Type 2 channel access procedure for transmissions on the RO resource and/or the PO resource.

Optionally, if the gap between the starting point of the RO resource and the ending point of the previous transmission (e.g., gNB's DL transmission) is up to 16 us, the UE may use Type 2C channel access procedure for transmissions on the RO resource and/or the PO resource.

Optionally, if the gap between the starting point of the RO resource and the ending point of the previous transmission (e.g., gNB's DL transmission) is more than or equal to 16 us but less than 25 us, the UE may use Type 2B channel access procedure for transmissions on the RO resource and/or the PO resource.

Optionally, if the gap between the starting point of the RO resource and the ending point of the previous transmission (e.g., gNB's DL transmission) is more than or equal to 25 us, the UE may use Type 2A channel access procedure for transmissions on the RO resource and/or the PO resource.

Figure 7:
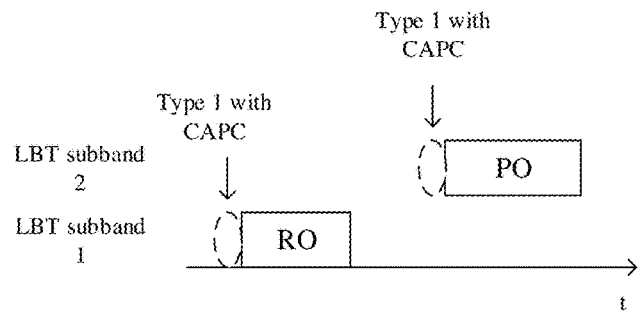
FIG. 7 schematically illustrates another example of relations between RACH occasion resource and PUSCH occasion resource.

One example is as FIG. 7 shown.

It should be noted that Type 1 and Type 2 channel access procedures are supported in dynamic channel access mode. In shared spectrum, a NR-U network deployment can be operated in either dynamic channel access mode (Lode based Equipment mode, LBE mode) or semi-static channel access mode (Frame based Equipment mode, FBE mode). In the following, we will introduce semi-static channel access.

A UE can be configured with semi-static channel access, or which is also called that the UE is configured with FBE (Frame based equipment) channel access mode.

As one example, UE can be provided by gNB with higher layer parameters ChannelAccessMode-r16='semistatic' by SIB1 or dedicated configuration, and/or, a periodic channel occupancy which can be initiated by the gNB, and/or, a periodic channel occupancy which can be initiated by the UE.

Optionally, a periodic channel occupancy is also called as an FFP (Fixed Frame Period). If a periodic channel occupancy is configured to be initiated by the gNB, then the periodic channel occupancy can be called as gNB FFP (or gNB's FFP, or FFP initiated by the gNB). If a periodic channel occupancy is configured to be initiated by the UE, then the periodic channel occupancy can be called as UE FFP (or UE's FFP, or FFP initiated by the UE). One periodic channel occupancy configuration comprises multiple periodic channel occupancies (or one FFP configuration comprises multiple FFPs).

A periodic channel occupancy comprises a COT (channel occupancy time). The start of the COT is aligned with the start of the FFP. If the device (the gNB or the UE) obtains the channel after successfully sensing for evaluating a channel availability (e.g., LBT success), the device is allowed to perform transmission in the COT, and/or, the device may share the COT to another device (e.g., gNB shares to UE, or UE shares to gNB) for performing transmission. The COT duration should be less than or equal to a maximum COT (maximum channel occupancy time, MCOT) duration Ty.

Optionally, the COT duration is determined by the MCOT, or the COT duration is indicated by the device (e.g., the gNB or the UE) which initiated the FFP (or which perform the LBT for the COT successfully).

A periodic channel occupancy also comprises an IP (idle period). The end of the IP is aligned with the end of the FFP. The IP duration should be at least equal to Tz.

Optionally, the minimum IP duration Tz is determined by the FFP duration Tx. The FFP duration is also called as the periodic channel occupancy duration.

Optionally, Tz=max (0.05Tx, 100 us).

Optionally, the MCOT duration Ty is determined by the FFP duration Tx and/or the IP duration Tz.

Optionally, Ty=0.95Tx, or, Ty=Tx−Tz.

Optionally, Tx is configured by the gNB. For example, Tx is configured by SIB1 or dedicated configuration.

As one example, Tx can be configured with one value of {0.5 ms, 1 ms, 2 ms, 2.5 ms, 4 ms, 5 ms, 8 ms, 10 ms}.

As one example, a periodic channel occupancy can be initiated by the gNB or UE every Tx within every two consecutive radio frames, starting from the even indexed radio frame at i*Tx, where $$i \in \left\{0, 1, \ldots, \frac{20}{T_x} - 1\right\}.$$

Optionally, if the COT duration corresponding to a FFP is used for performing transmission, the IP corresponding to the same FFP is not allowed for performing transmission. Optionally, the COT duration corresponding to a FFP is used for performing transmission, comprises: the FFP is initiated by a device after LBT success and the COT in the FFP is used for performing transmission.

Optionally, if one UE is configured with one gNB FFP and one UE FFP, the gNB FFP and the UE FFP are partially or fully overlapped in the frequency domain. For example, the gNB FFP and the UE FFP are within a same LBT subband.

Optionally, the channel access procedure to initiate a COT by a device (e.g., gNB or UE) with semi-static channel access mode, comprises:
  sensing the channel, by the device, for at least a sensing slot duration of a fourth value;
  performing transmission, by the device, immediately after sensing the channel to be idle; or not performing transmission, by the device, if the channel is sensed to be busy.
  As an example, the fourth value is 9 us.

Optionally, the channel access procedure to initiate a COT corresponds to a first energy detection threshold.

As a specific example, the channel access procedure to initiate a COT by a UE with semi-static channel access mode, comprises:
  the UE shall transmit a transmission burst starting at the beginning of the channel occupancy time immediately after sensing the channel to be idle for at least a sensing slot duration, e.g., $T_{sl}$=9 us. If the channel is sensed to be busy, the UE shall not perform any transmission during the current period.

Optionally, the channel access procedure to share a COT by a device (e.g., gNB or UE) with semi-static channel access mode, comprises:
  sensing the channel, by the device, for at least a sensing slot duration of a fifth value;
  performing transmission, by the device, immediately after sensing the channel to be idle; or not performing the transmission, by the device, if the channel is sensed to be busy.

Optionally, a time duration between the transmission to be transmitted and the previous transmission burst within the same COT is more than or equal to a sixth value.

As an example, the fifth value is 9 us. The sensing slot duration of a fifth value, comprises: a sensing slot duration of 9 us within a 25 us interval ending immediately before the uplink transmission.

As an example, the sixth value is 16 us.

Optionally, the channel access procedure to share a COT corresponds to a second energy detection threshold.

Optionally, the first energy detection threshold and the second energy detection threshold are different, or the first energy detection threshold and the second energy detection threshold are independently configured.

Optionally, the channel access procedure to share a COT by a device (e.g., gNB or UE) with semi-static channel access mode, comprises:
  performing transmission, by the device, without sensing the channel, if a time duration between the transmission to be transmitted and the previous transmission burst within the same COT is less than or equal to the sixth value.

Optionally, the shared COT can be initiated either by a gNB or by a UE. Further, if the shared COT is initiated by a gNB, the previous transmission burst can be a DL transmission burst(s); or if the shared COT is initiated by a UE, the previous transmission burst can be an UL transmission burst(s).

As a specific example, the channel access procedure to share a COT by a UE with semi-static channel access mode for PRACH and/or Msg A PUSCH transmission, where the COT is initiated by the gNB, and the UE detects a transmission burst(s) within the COT, comprises:
  if the gap between the UL transmission and DL transmission bursts is at most 16 us, the UE may transmit the UL transmission after a DL transmission burst(s) within the COT without sensing the channel; Or,
  if the gap between the UL transmission and DL transmission bursts is more than 16 us, the UE may transmit the UL transmission after a DL transmission burst(s) within the COT after sensing the channel to be idle for at least a sensing slot duration $T_{sl}$=9 us within a 25 us interval ending immediately before the UL transmission;
  wherein the UL transmission comprises PRACH transmission and/or Msg A PUSCH transmission.

As a specific example, the channel access procedure to share a COT by a UE with semi-static channel access mode for PRACH and/or Msg A PUSCH transmission, where the COT is initiated by the UE, and the UE transmits a transmission burst(s) within the COT, comprises:
  if the gap between the UL transmission and a previous UL transmission is at most 16 us, the UE may transmit the UL transmission after the previous UL transmission within the COT without sensing the channel; Or, if the gap between the UL transmission and a previous UL transmission is more than 16 us, the UE may transmit the UL transmission after the previous UL transmission within the COT after sensing the channel to be idle for at least a sensing slot duration $T_{sl}$=9 us within a 25 us interval ending immediately before the UL transmission;

wherein the UL transmission comprises PRACH transmission and/or Msg A PUSCH transmission.

In some optional embodiments, if the RO resource and/or the PO resource are configured in the gNB COT, after detection of a DL transmission burst(s) within the gNB COT, the UE may transmit the PRACH on the RO resource and/or the Msg A PUSCH on the PO resource after a successful LBT with the channel access procedure to share a COT initiated by the gNB.

In some optional embodiments, if the RO resource and/or the PO resource are configured in the gNB idle period, the UE shall not transmit the PRACH on the RO resource and/or the Msg A PUSCH on the PO resource, or the UE may take the RO resource and/or the PO resource as invalid resources.

In some optional embodiments, if the RO resource and/or the PO resource are configured in the UE COT, and the RO resource and/or the PO resource are configured from the beginning of the UE COT (i.e., the RO resource and/or the PO resource are aligned with the UE FFP boundary), the UE may transmit the PRACH on the RO resource and/or the Msg A PUSCH on the PO resource after a successful LBT with the channel access procedure to initiate a COT by the UE.

In some optional embodiments, if the RO resource and/or the PO resource are configured in the UE COT, and the RO resource and/or the PO resource are not configured from the beginning of the UE COT (i.e., the RO resource and/or the PO resource are not aligned with the UE FFP boundary), after transmission of a UL transmission burst(s) within the UE COT, the UE may transmit the PRACH on the RO resource and/or the Msg A PUSCH on the PO resource after a successful LBT with the channel access procedure to share a COT initiated by the UE.

In some optional embodiments, if the RO resource and/or the PO resource are configured in the UE idle period, the UE shall not transmit the PRACH on the RO resource and/or the Msg A PUSCH on the PO resource, or the UE may take the RO resource and/or the PO resource as invalid resources.

In some optional embodiments, if the RO resource and/or the PO resource are configured in the gNB COT, and the RO resource and/or the PO resource are also in the UE COT, and the RO resource and/or the PO resource are configured from the beginning of the UE COT (i.e., the RO resource and/or the PO resource are aligned with the UE FFP boundary), the channel access procedure for PRACH transmission on the RO resource and/or the Msg A PUSCH transmission on the PO resource, comprises at least one of the following:

the channel access procedure to share a COT initiated by the gNB;

the channel access procedure to initiate a COT by the UE.

Optionally, which channel access procedure should be used in this case is determined by a predefined rule, or is indicated/configured by the gNB.

As an example of which channel access procedure should be used is determined by a predefined rule, assume a RO resource is configured in the gNB COT, and the RO resource is also configured in the UE COT, and the RO resource is configured from the beginning of the UE COT, if the UE detects a DL transmission burst(s) within the gNB COT, the UE may transmit the PRACH on the RO resource after a successful LBT with the channel access procedure to share a COT initiated by the gNB; or if the UE does not detect a DL transmission burst(s) within the gNB COT, the UE may transmit the PRACH on the RO resource after a successful LBT with the channel access procedure to initiate a COT by the UE itself; or the UE shall not transmit the PRACH on the RO resource if the corresponding LBT fails.

In some optional embodiments, if the RO resource and/or the PO resource are configured in the gNB COT, and the RO resource and/or the PO resource are also in the UE COT, and the RO resource and/or the PO resource are not configured from the beginning of the UE COT (i.e., the RO resource and/or the PO resource are not aligned with the UE FFP boundary), the channel access procedure for PRACH transmission on the RO resource and/or the Msg A PUSCH transmission on the PO resource, comprises at least one of the following:

the channel access procedure to share a COT initiated by the gNB;

the channel access procedure to share a COT initiated by the UE.

Optionally, which channel access procedure should be used in this case is determined by a predefined rule, or is indicated/configured by the gNB.

As an example of which channel access procedure should be used is determined by a predefined rule, assume a PO resource is configured in the gNB COT, and the PO resource is also configured in the UE COT, and the PO resource is not configured from the beginning of the UE COT, and the UE transmits the PRACH on the corresponding RO resource. If the UE detects a DL transmission burst(s) within the gNB COT, the UE may transmit the Msg A PUSCH on the PO resource after a successful LBT with the channel access procedure to share a COT initiated by the gNB; or if the UE transmits a UL transmission burst(s) within the UE COT initiated by the UE, the UE may transmit the Msg A PUSCH on the PO resource after a successful LBT with the channel access procedure to share a COT initiated by the UE; or the UE shall not transmit the Msg A PUSCH on the PO resource if the corresponding LBT fails.

In some optional embodiments, if the RO resource and/or the PO resource are configured in the gNB COT, and the RO resource and/or the PO resource are also in the UE idle period, the channel access procedure for PRACH transmission on the RO resource and/or the Msg A PUSCH transmission on the PO resource, comprises the channel access procedure to share a COT initiated by the gNB.

In some optional embodiments, if the RO resource and/or the PO resource are configured in the UE COT, and the RO resource and/or the PO resource are configured from the beginning of the UE COT, and the RO resource and/or the PO resource are also in the gNB idle period, the channel access procedure for PRACH transmission on the RO resource and/or the Msg A PUSCH transmission on the PO resource, comprises the channel access procedure to initiate a COT by the UE.

In some optional embodiments, if the RO resource and/or the PO resource are configured in the UE COT, and the RO resource and/or the PO resource are not configured from the beginning of the UE COT, and the RO resource and/or the PO resource are also in the gNB idle period, the channel access procedure for PRACH transmission on the RO resource and/or the Msg A PUSCH transmission on the PO resource, comprises the channel access procedure to share a COT initiated by the UE.

In some optional embodiments, if the RO resource and/or the PO resource are configured in the gNB idle period, and the RO resource and/or the PO resource are also in the UE idle period, the UE shall not transmit the PRACH on the RO resource and/or the Msg A PUSCH on the PO resource, or the UE may take the RO resource and/or the PO resource as invalid resources.

In some optional embodiments, if the UE fails LBT for performing PRACH transmission on a RO resource, the UE does not perform LBT for the corresponding Msg A PUSCH transmission on the corresponding PO resource.

In some optional embodiments, if one UL resource (e.g., RO resource or PO resource or other UL resource) is aligned with UE FFP boundary, the UE may initiate a COT for performing transmission on the UL resource; if one UL resource is not aligned with UE FFP boundary, the UE is not allowed to initiate a COT for performing transmission on the UL resource.

Figure 15:
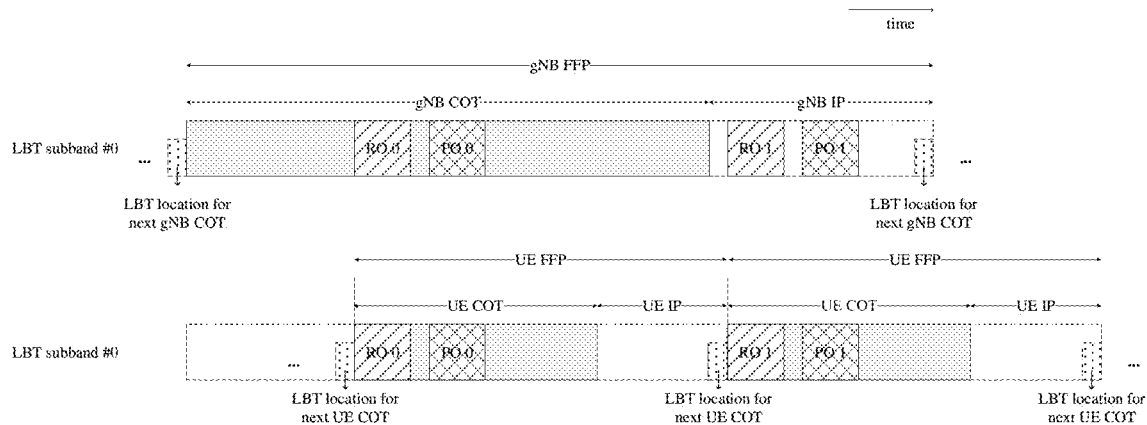
FIG. 15 schematically illustrates an example of relations between RACH occasion resource and PUSCH occasion resource in semi-static channel access mode.

The FIG. 15 gives one example. UE is configured with one gNB FFP and one UE FFP. Both the gNB FFP and the UE FFP are within a same LBT subband #0 (i.e., the gNB FFP and the UE FFP are fully overlapped in the frequency domain). The RO resource is configured from the beginning of the UE COT (i.e., the RO resource is aligned with the UE FFP boundary). Note that RO 0 and PO 0 are associated for Msg A transmission; RO 1 and PO 1 are associated for Msg A transmission.

In some cases, the RO resource may be configured within the gNB COT and also within the UE COT, e.g., as RO 0 shown in FIG. 15. In some cases, the PO resource may be configured within the gNB COT and also within the UE COT, and the PO resource is not aligned with the UE FFP boundary, e.g., as PO 0 shown in FIG. 15.

When UE plans to transmit Msg A on RO 0 and PO 0, if the UE detects a DL transmission burst(s) within the gNB COT, the UE may perform the channel access procedure to share a COT initiated by the gNB. The UE may transmit the PRACH on the RO 0 resource after a successful LBT, or the UE shall not transmit the PRACH on the RO 0 resource if the corresponding LBT fails.

Or, if the UE does not detect a DL transmission burst(s) within the gNB COT, the UE may perform the channel access procedure to initiate a COT by the UE itself. The UE may transmit the PRACH on the RO 0 resource after a successful LBT, or the UE shall not transmit the PRACH on the RO 0 resource if the corresponding LBT fails.

If UE transmits the PRACH on the RO 0 resource with the channel access procedure to share a COT initiated by the gNB, the UE may perform the channel access procedure to share a COT initiated by the gNB for Msg A PUSCH transmission on the PO 0 resource. The UE may transmit the Msg A PUSCH on the PO 0 resource after a successful LBT, or the UE shall not transmit the Msg A PUSCH on the PO 0 resource if the corresponding LBT fails.

If UE transmits the PRACH on the RO 0 resource with the channel access procedure to initiate a COT by the UE itself, the UE may perform the channel access procedure to share a COT initiated by the UE for Msg A PUSCH transmission on the PO 0 resource. The UE may transmit the Msg A PUSCH on the PO 0 resource after a successful LBT, or the UE shall not transmit the Msg A PUSCH on the PO 0 resource if the corresponding LBT fails.

If UE does not transmit the PRACH on the RO 0 resource, the UE shall not transmit the Msg A PUSCH on the PO 0 resource, and the UE shall not perform LBT for the Msg A PUSCH transmission on the PO 0 resource.

In some cases, the RO resource may be configured within the UE COT and also within the gNB idle period, e.g., as RO 1 shown in the Figure. In some cases, the PO resource may be configured within the UE COT and also within the gNB idle period, and the PO resource is not aligned with the UE FFP boundary, e.g., as PO 1 shown in FIG. 15.

When UE plans to transmit Msg A on RO 1 and PO 1, the UE may perform the channel access procedure to initiate a COT by the UE itself. The UE may transmit the PRACH on the RO 1 resource after a successful LBT, or the UE shall not transmit the PRACH on the RO 1 resource if the corresponding LBT fails.

If UE transmits the PRACH on the RO 1 resource, the UE may perform the channel access procedure to share the COT initiated by the UE for Msg A PUSCH transmission on the PO 1 resource. The UE may transmit the Msg A PUSCH on the PO 1 resource after a successful LBT, or the UE shall not transmit the Msg A PUSCH on the PO 1 resource if the corresponding LBT fails.

If UE does not transmit the PRACH on the RO 1 resource, the UE shall not transmit the Msg A PUSCH on the PO 1 resource, and the UE shall not perform LBT for the Msg A PUSCH transmission on the PO 1 resource.

Figure 16:
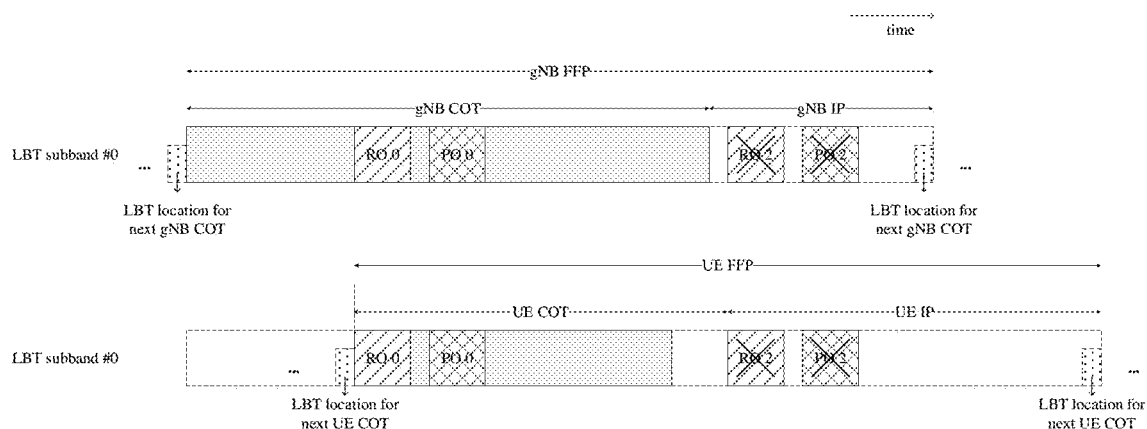
FIG. 16 schematically illustrates an example of relations between RACH occasion resource and PUSCH occasion resource in semi-static channel access mode.

The FIG. 16 gives another example. UE is configured with one gNB FFP and one UE FFP. Both the gNB FFP and the UE FFP are within a same LBT subband #0 (i.e., the gNB FFP and the UE FFP are fully overlapped in the frequency domain).

In some cases, the RO resource may be configured within the gNB idle period and also within the UE idle period, e.g., as RO 2 shown in FIG. 16. In those cases, the UE shall not transmit the PRACH on the RO 2 resource, or the UE may take the RO 2 resource as invalid resource.

In some cases, the PO resource may be configured within the gNB idle period and also within the UE idle period, e.g., as PO 2 shown in FIG. 16. In those cases, the UE shall not transmit the Msg A PUSCH on the PO 2 resource, or the UE may take the PO 2 resource as invalid resource.

The embodiments of the present disclosure provide a method of LBT type determination for the 2-step RACH procedure, which is necessary to support NR-U standalone deployment in unlicensed spectrum. With this method, a UE may perform initial access procedure in a shared band without introducing unfair coexistence to other communication in the same band.

Figure 8:
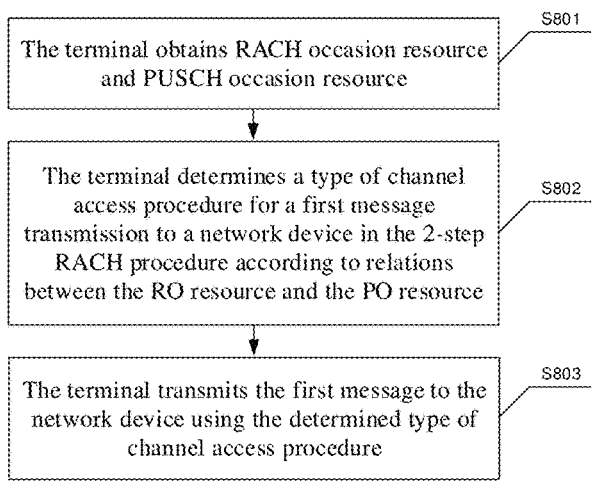
FIG. 8 schematically illustrates a flowchart of an access control method according to an embodiment of the present disclosure.

FIG. 8 schematically illustrates a flowchart of an access control method according to an embodiment of the present disclosure. The method may be applied, for example, to a terminal. The terminal may be a UE in NR system operating in unlicensed spectrum.

Referring to FIG. 8, the access control method 80 comprises:

In Step S801, the terminal obtains RACH occasion resource and PUSCH occasion resource.

RACH occasion resource for PRACH transmission is defined by a frequency resource and a time resource. And a PUSCH occasion for PUSCH transmission is defined by a frequency resource and a time resource.

The terminal may obtain some RACH configuration from the upper layer (e.g. Radio Resource Control (RRC) layer), and determine the RO resource and the PO resource for a 2-step RACH procedure.

In Step S802, the terminal determines a type of channel access procedure for a first message transmission to a network device in the 2-step RACH procedure according to relations between the RO resource and the PO resource.

The first message includes a physical random access channel (PRACH) transmission and a PUSCH transmission.

In an embodiment of the present disclosure, the terminal further determines the Type 1 channel access procedure for transmissions on the RO resource and on the PO resource that initiate a channel occupancy with a configured/predefined uplink CAPC, when the RO resource and the PO resource are contiguous in time domain within the same LBT subband. The configured/predefined uplink CAPC is p in Table 1, for example, it may be set to 1.

In an embodiment of the present disclosure, the terminal further determines the Type 1 channel access procedure for transmission on the RO resource that initiate a channel occupancy with a configured/predefined uplink CAPC; and/or, determining the Type 2C channel access procedure for transmission on the PO resource, when the RO resource and the PO resource are separated by a gap of less than or equal to a first duration in time domain within the same LBT subband. The configured/predefined uplink CAPC is p in Table 1, for example, it may be set to 1. The first duration may be set to the value of $T_f=16$ us.

In an embodiment of the present disclosure, the terminal further determines the Type 1 channel access procedure for transmission on the RO resource that initiate a channel occupancy with a configured/predefined uplink CAPC; and/or, determining the Type 2B channel access procedure for transmission on the PO resource, when the RO resource and the PO resource are separated by a gap of more than or equal to a first duration but less than a second duration in time domain within the same LBT subband. The configured/predefined uplink CAPC is p in Table 1, for example, it may be set to 1. The first duration may be set to the value of $T_f=16$ us. And the second duration may be set to the value of $T_{short\_ul}=25$ us.

In an embodiment of the present disclosure, the terminal further determines the Type 1 channel access procedure for transmission on the RO resource that initiate a channel occupancy with a configured/predefined uplink CAPC; and/or, determining the Type 2A channel access procedure for transmission on the PO resource, when the RO resource and the PO resource are separated by a gap of more than or equal to a second duration but less than or equal to a first threshold value in time domain within the same LBT subband. The configured/predefined uplink CAPC is p in Table 1, for example, it may be set to 1. The second duration may be set to the value of $T_{short\_ul}=25$ us.

In an embodiment of the present disclosure, the first threshold value is determined by at least one of the following: the symbol length of the RO resource, the symbol length of PO resource, and the MCOT corresponding to the configured/predefined uplink CAPC. The MCOT is $T_{ulm\_cot,p}$ in Table 1, for example, if the configured/predefined uplink CAPC equals to 1, the MCOT shall be determined 2 ms. In an embodiment of the present disclosure, the first threshold value may equal to the MCOT minus the symbol length of the RO resource and the symbol length of PO resource. For example, p=1, the MCOT is 2 ms, assume the symbol length of the RO resource is 0.5 ms, the symbol length of PO resource is 0.5 ms, then the first threshold value is 1 ms. Optionally, the first threshold value is 2 ms.

In an embodiment of the present disclosure, the terminal further determines the Type 1 channel access procedure for transmission on the RO resource that initiate a channel occupancy with a first configured/predefined uplink CAPC; and/or, determining the Type 1 channel access procedure for transmission on the PO resource that initiate a channel occupancy with a second configured/predefined uplink CAPC, when the RO resource and the PO resource are separated by a gap of more than a second threshold value in time domain within the same LBT subband, and/or, the RO resource and the PO resource are located in the different LBT subband. The first configured/predefined uplink CAPC and the second configured/predefined uplink CAPC are both p in Table 1. For example, the first configured/predefined uplink CAPC may be set to 1 and the second configured/predefined uplink CAPC may be also set to 1. In an embodiment of the present disclosure, the first configured/predefined uplink CAPC is less than or equal to the second configured/predefined uplink CAPC. In an embodiment of the present disclosure, the second configured/predefined uplink CAPC is determined based on the service trigger PRACH transmission. For example, the second configured/predefined uplink CAPC is determined based on the service associated with the Msg A, the service may be eMBB (Enhanced Mobile Broadband) service, URLLC (Ultra-reliable and Low Latency Communication) service or eMTC (Enhanced Machine Type Communication), or the service may be SRB0, SRB1, SRB2, SRB3, DRB, MAC CEs, BSR, etc, and the present disclosure is not limited thereto.

In an embodiment of the present disclosure, the second threshold value is determined by at least one of the following: the symbol length of the RO resource, the symbol length of PO resource, the MCOT corresponding to the configured/predefined uplink CAPC. The MCOT is $T_{ulm\_cot,p}$ in Table 1, for example, if the configured/predefined uplink CAPC equals to 1, the MCOT shall be determined 2 ms. In an embodiment of the present disclosure, the second threshold value equals to the MCOT minus the symbol length of the RO resource and the symbol length of PO resource. For example, p=1, the MCOT is 2 ms, assume the symbol length of the RO resource is 0.5 ms, the symbol length of PO resource is 0.5 ms, then the second threshold value is 1 ms. Optionally, the second threshold value is 1 ms or 2 ms. Optionally, the second threshold value is the same value as the first threshold value above-mentioned.

In an embodiment of the present disclosure, the terminal further determines the type of channel access procedure for the first transmission in the 2-step RACH procedure according to the relations between the RO resource and the PO resource and whether the PO resource is within the network device's COT.

In an embodiment of the present disclosure, the terminal may determine the Type 2 channel access procedure for transmissions on the PO resource if the PO resource is within the network device's COT, when the RO resource and the PO resource are separated by a gap of less than or equal to the first duration (e.g. 16 us) in time domain within the same LBT subband. For example, since the gap between the starting point of the PO resource and the ending point of the RO resource is less than or equal to 16 us, the terminal may use Type 2C channel access procedure for transmissions on the PO resource.

In an embodiment of the present disclosure, the terminal may determine the Type 2 channel access procedure for transmissions on the PO resource if the PO resource is within the network device's COT, when the RO resource and the PO resource are separated by a gap of more than or equal to the first duration (e.g. 16 us) but less than the second duration (e.g. 25 us) in time domain within the same LBT subband. For example, since the gap between the starting point of the PO resource and the ending point of the RO resource is more than or equal to 16 us but less than 25 us, the terminal may use Type 2B channel access procedure for transmissions on the PO resource.

In an embodiment of the present disclosure, the terminal may determine the Type 2 channel access procedure for transmissions on the PO resource if the PO resource is within the network device's COT, when the RO resource and the PO resource are separated by a gap of more than or equal to the second duration (e.g. 25 us) but less than or equal to the first threshold value in time domain within the same LBT subband. For example, since the gap between the starting point of the PO resource and the ending point of the RO resource is more than or equal to 25 us but less than or equal to the first threshold value, the terminal may use Type 2A channel access procedure for transmissions on the PO resource.

In Step S803, the terminal transmits the first message to the network device using the determined type of channel access procedure.

The embodiments of the present disclosure provide an access control method. In this method, the terminal determines the type of channel access procedure for a first message transmission to a network device in a 2-step RACH procedure according to relations between the RO resource and the PO resource. With this method, the terminal may perform initial access procedure in a shared band without introducing unfair coexistence to other communication in the same band.

Figure 9:
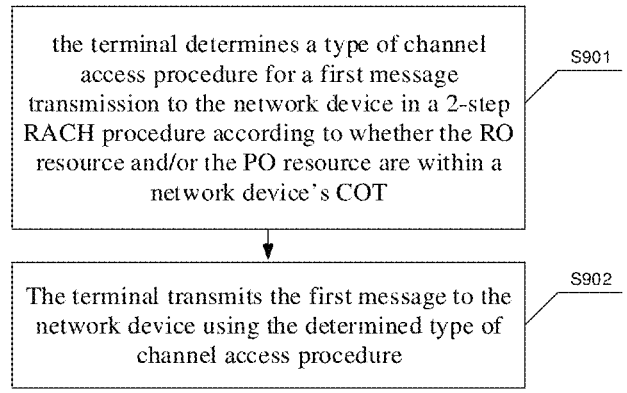
FIG. 9 schematically illustrates a flowchart of an access control method according to another embodiment of the present disclosure.

FIG. 9 schematically illustrates a flowchart of an access control method according to another embodiment of the present disclosure. The method may be applied, for example, to a terminal. The terminal may be a UE in NR system operating in unlicensed spectrum.

Referring to FIG. 9, the access control method 90 comprises:

In Step S901, the terminal determines a type of channel access procedure for a first message transmission to the network device in a 2-step RACH procedure according to whether the RO resource and/or the PO resource are within a network device's COT.

The first message includes a PRACH transmission and a PUSCH transmission.

In an embodiment of the present disclosure, the terminal may determine the Type 2 channel access procedure for transmissions on the RO resource and/or the PO resource if the RO resource and/or the PO resource are within the network device's COT.

In an embodiment of the present disclosure, the terminal may further determine the Type 2C channel access procedure for transmissions on the RO resource and/or the PO resource if the gap between the starting point of the RO resource and the ending point of the previous transmission (e.g., the network device's DL transmission) is less than a first duration. The first duration may be set to the value of $T_f=16$ us.

In an embodiment of the present disclosure, the terminal may further determine the Type 2B channel access procedure for transmissions on the RO resource and/or the PO resource if the gap between the starting point of the RO resource and the ending point of the previous transmission (e.g., the network device's DL transmission) is more than or equal to a first duration but less than a second duration. The first duration may be set to the value of $T_f=16$ us. And the second duration may be set to the value of $T_{short\_ul}=25$ us.

In an embodiment of the present disclosure, the terminal may further determine the Type 2A channel access procedure for transmissions on the RO resource and/or the PO resource if the gap between the starting point of the RO resource and the ending point of the previous transmission (e.g., the network device's DL transmission) is more than or equal to a second duration. The second duration may be set to the value of $T_{short\_ul}=25$ us.

In an embodiment of the present disclosure, the access control method 90 may further comprise: the terminal obtain RO resource and PO resource. And the terminal may further determine the type of channel access procedure for the first transmission in the 2-step RACH procedure according to the relations between the RO resource and the PO resource and whether the PO resource is within the network device's COT.

In an embodiment of the present disclosure, the terminal may further determine the Type 2 channel access procedure for transmissions on the PO resource if the PO resource is within the network device's COT, when the RO resource and the PO resource are separated by a gap of less than or equal to the first duration (e.g. 16 us) in time domain within the same LBT subband. For example, since the gap between the starting point of the PO resource and the ending point of the RO resource is less than or equal to 16 us, the terminal may use Type 2C channel access procedure for transmissions on the PO resource.

In an embodiment of the present disclosure, the terminal may further determine the Type 2 channel access procedure for transmissions on the PO resource if the PO resource is within the network device's COT, when the RO resource and the PO resource are separated by a gap of more than or equal to the first duration (e.g. 16 us) but less than the second duration (e.g. 25 us) in time domain within the same LBT subband. For example, since the gap between the starting point of the PO resource and the ending point of the RO resource is more than or equal to 16 us but less than 25 us, the terminal may use Type 2B channel access procedure for transmissions on the PO resource.

In an embodiment of the present disclosure, the terminal may further determine determining the Type 2 channel access procedure for transmissions on the PO resource if the PO resource is within the network device's COT, when the RO resource and the PO resource are separated by a gap of more than or equal to the second duration (e.g. 25 us) but less than or equal to the first threshold value in time domain within the same LBT subband. For example, since the gap between the starting point of the PO resource and the ending point of the RO resource is more than or equal to 25 us but less than or equal to the first threshold value, the terminal may use Type 2A channel access procedure for transmissions on the PO resource.

In Step S902, the terminal transmits the first message to the network device using the determined type of channel access procedure.

The embodiments of the present disclosure provide an access control method. In this method, the terminal determines the type of channel access procedure for a first message transmission to a network device in a 2-step RACH procedure according to whether the RO resource and/or the PO resource are within a network device's COT. With this method, the terminal may perform initial access procedure in a shared band without introducing unfair coexistence to other communication in the same band.

Figure 10:
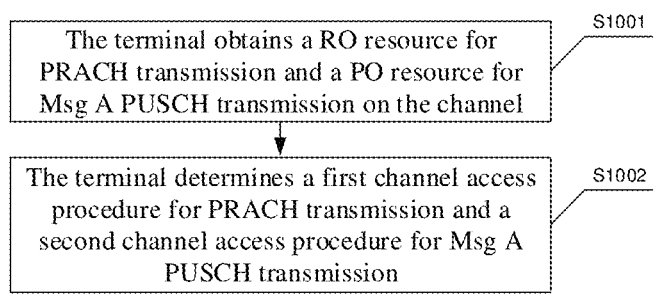
FIG. 10 schematically illustrates a flowchart of an access control method according to another embodiment of the present disclosure.

FIG. 10 schematically illustrates a flowchart of a method of accessing to a channel in shared spectrum according to another embodiment of the present disclosure. The method may be applied, for example, to a terminal. The terminal may be a UE in NR system operating in unlicensed spectrum.

Referring to FIG. 10, the access control method 100 comprises: In Step S1001, the terminal obtains a RO resource for PRACH transmission and a PO resource for Msg A PUSCH transmission on the channel.

In Step S1002, the terminal determines a first channel access procedure for PRACH transmission and a second channel access procedure for Msg A PUSCH transmission.

Wherein, the first channel access procedure comprises: a channel access procedure to initiate a first COT; or, a channel access procedure to share a second COT initiated by a network device, if the RO resource is within the second COT.

For example, the channel access procedure to initiate a COT may be Type 1 channel access procedure as above-mentioned. And the channel access procedure to share a COT initiated by a network device may be Type 2 channel access procedure as above-mentioned.

In an embodiment of the present disclosure, the first channel access procedure comprises Type 1 channel access procedure with a first UL CAPC p1 to initiate the first COT.

In an embodiment of the present disclosure, the first UL CAPC p1=1.

In an embodiment of the present disclosure, the first channel access procedure comprises Type 2A channel access procedure to share the second COT initiated by the network device, if the RO resource is within the second COT.

In an embodiment of the present disclosure, the second channel access procedure comprises Type 1 channel access procedure with a second UL CAPC p2, if the RO resource and the PO resource are within a same LBT subband of the channel in frequency domain and a time duration between the RO resource and the PO resource is more than or equal to a first value, or the RO resource and the PO resource are within different LBT subbands of the channel in frequency domain.

As an example, the first value is 25 us.

In an embodiment of the present disclosure, the second UL CAPC p2=1, or the second UL CAPC p2 is determined according to the service associated with the Msg A.

In an embodiment of the present disclosure, the second channel access procedure comprises Type 2A channel access procedure to share the second COT, if the PO resource is within the second COT.

In an embodiment of the present disclosure, the first channel access procedure comprises a channel access procedure to initiate a first COT, and the second channel access procedure comprises a channel access procedure to share the first COT initiated by the terminal device, if the PO resource is within the first COT.

In an embodiment of the present disclosure, the PO resource is within the first COT, comprises: the RO resource and the PO resource are within the maximum channel occupancy time (MCOT) corresponding to the first COT.

In an embodiment of the present disclosure, the second channel access procedure comprises Type 2A channel access procedure, if the RO resource and the PO resource are within a same LBT subband of the channel in frequency domain and a time duration between the RO resource and the PO resource is more than or equal to a second value.

As an example, the second value is 25 us.

In an embodiment of the present disclosure, the second channel access procedure comprises Type 2B channel access procedure, if the RO resource and the PO resource are within a same LBT subband of the channel in frequency domain and a time duration between the RO resource and the PO resource is more than or equal to a third value and less than a second value.

As an example, the third value is 16 us.

In an embodiment of the present disclosure, the second channel access procedure comprises Type 2C channel access procedure, if the RO resource and the PO resource are within a same LBT subband of the channel in frequency domain and a time duration between the RO resource and the PO resource is less than or equal to a third value.

In an embodiment of the present disclosure, the terminal device is configured with dynamic channel access; or the terminal device is not configured with semi-static channel access.

In an embodiment of the present disclosure, the first channel access procedure comprises the channel access procedure to initiate the first COT, if the RO resource is configured from the beginning of the first COT, wherein the first COT corresponds to a first periodic channel occupancy on the channel, and the first periodic channel occupancy is configured to be initiated by the terminal device.

In an embodiment of the present disclosure, the first channel access procedure comprises the channel access procedure to share the second COT initiated by the network device, if the RO resource is within the second COT, wherein the second COT corresponds to a second periodic channel occupancy on the channel, and the second periodic channel occupancy is configured to be initiated by the network device.

In an embodiment of the present disclosure, the second channel access procedure comprises a channel access procedure to initiate a third COT, if the PO resource is configured from the beginning of the third COT, wherein the third COT corresponds to a third periodic channel occupancy on the channel, and the third periodic channel occupancy is configured to be initiated by the terminal device.

In an embodiment of the present disclosure, the second channel access procedure comprises the channel access procedure to share the second COT initiated by the network device, if the PO resource is within the second COT, wherein the second COT corresponds to a second periodic channel occupancy on the channel, and the second periodic channel occupancy is configured to be initiated by the network device.

In an embodiment of the present disclosure, the second channel access procedure comprises a channel access procedure to share the first COT initiated by the terminal device, if the PO resource is within the first COT, wherein the first COT corresponds to a first periodic channel occupancy on the channel, and the first periodic channel occupancy is configured to be initiated by the terminal device.

In an embodiment of the present disclosure, the first or second channel access procedure to initiate a COT, comprises: sensing the channel, by the terminal device, for at least a sensing slot duration of a fourth value; performing transmission, by the terminal device, immediately after sensing the channel to be idle; or not performing transmission, by the terminal device, if the channel is sensed to be busy.

As an example, the fourth value is 9 us.

In an embodiment of the present disclosure, the first or second channel access procedure to initiate the COT corresponds to a first energy detection threshold.

In an embodiment of the present disclosure, the first or second channel access procedure to share a COT, comprises: sensing the channel, by the terminal device, for at least a sensing slot duration of a fifth value; performing uplink transmission, by the terminal device, immediately after sensing the channel to be idle; or not performing the uplink transmission, by the terminal device, if the channel is sensed to be busy, wherein the uplink transmission comprises PRACH transmission and/or Msg A PUSCH transmission.

As an example, the fifth value is 9 us, or the fifth value is 9 us and the 9 us is within a 25 us interval ending immediately before transmission.

In an embodiment of the present disclosure, a time duration between the uplink transmission and the previous transmission within the same COT is more than or equal to a sixth value.

As an example, the sixth value is 16 us.

In an embodiment of the present disclosure, the first or second channel access procedure to share the COT corresponds to a second energy detection threshold.

In an embodiment of the present disclosure, the first energy detection threshold and the second energy detection threshold are independently configured.

In an embodiment of the present disclosure, the first or second channel access procedure to share a COT, comprises: performing uplink transmission, by the terminal device, without sensing the channel, wherein the uplink transmission comprises PRACH transmission and/or Msg A PUSCH transmission.

In an embodiment of the present disclosure, a time duration between the uplink transmission and the previous transmission within the same COT is less than or equal to a sixth value.

In an embodiment of the present disclosure, the method 100 further comprising: determining, by the terminal device, the first channel access procedure comprises either the channel access procedure to initiate the first COT or the channel access procedure to share a second COT according to a configuration from the network or a predefined rule.

In an embodiment of the present disclosure, the RO resource and the PO resource are within a same LBT subband of the channel in frequency domain.

In an embodiment of the present disclosure, the terminal device is configured with semi-static channel access.

The following is embodiments of the device of the present disclosure, which can be used to carry out the method embodiments of the present disclosure. For details not disclosed in the embodiment of the device of the present disclosure, please refer to the method embodiments of the present disclosure.

Figure 11:
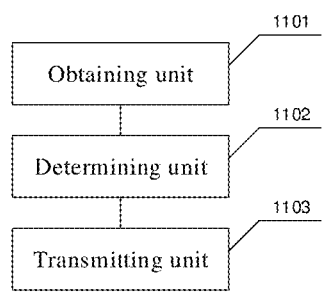
FIG. 11 schematically illustrates a terminal according to an embodiment of the present disclosure.

FIG. 11 schematically illustrates a terminal according to an embodiment of the present disclosure. The terminal may be a UE in NR system operating in unlicensed spectrum.

Referring to FIG. 11, the terminal 110 comprises: an obtaining unit 1101 a determining unit 1102 and a transmitting unit 1103.

The obtaining unit 1101 is configured to obtain RO resource and PO resource.

The determining unit 1102 is configured to determine a type of channel access procedure for a first message transmission to a network device in a 2-step RACH procedure according to relations between the RO resource and the PO resource.

The first message includes a PRACH transmission and a PUSCH transmission.

The transmitting unit 1103 is configured to transmit the first message to the network device using the determined type of channel access procedure.

In an embodiment of the present disclosure, the determining unit 1102 is further configured to determine the Type 1 channel access procedure for transmissions on the RO resource and on the PO resource that initiate a channel occupancy with a configured/predefined uplink CAPC, when the RO resource and the PO resource are contiguous in time domain within the same LBT subband.

In an embodiment of the present disclosure, the determining unit 1102 is further configured to determine the Type 1 channel access procedure for transmission on the RO resource that initiate a channel occupancy with a configured/predefined uplink CAPC; and/or, determining the Type 2C channel access procedure for transmission on the PO resource, when the RO resource and the PO resource are separated by a gap of less than or equal to a first duration in time domain within the same LBT subband.

In an embodiment of the present disclosure, the determining unit 1102 is further configured to determine the Type 1 channel access procedure for transmission on the RO resource that initiate a channel occupancy with a configured/predefined uplink CAPC; and/or, determining the Type 2B channel access procedure for transmission on the PO resource, when the RO resource and the PO resource are separated by a gap of more than or equal to a first duration but less than a second duration in time domain within the same LBT subband.

In an embodiment of the present disclosure, the determining unit 1102 is further configured to determine the Type 1 channel access procedure for transmission on the RO resource that initiate a channel occupancy with a configured/predefined uplink CAPC; and/or, determining the Type 2A channel access procedure for transmission on the PO resource, when the RO resource and the PO resource are separated by a gap of more than or equal to a second duration but less than or equal to a first threshold value in time domain within the same LBT subband.

In an embodiment of the present disclosure, the first threshold value is determined by at least one of the following: the symbol length of the RO resource, the symbol length of PO resource, and the MCOT corresponding to the configured/predefined uplink CAPC.

In an embodiment of the present disclosure, the first threshold value equals to the MCOT minus the symbol length of the RO resource and the symbol length of PO resource.

In an embodiment of the present disclosure, the determining unit 1102 is further configured to determine the Type 1 channel access procedure for transmission on the RO resource that initiate a channel occupancy with a first configured/predefined uplink CAPC; and/or, determining the Type 1 channel access procedure for transmission on the PO resource that initiate a channel occupancy with a second configured/predefined uplink CAPC, when the RO resource and the PO resource are separated by a gap of more than a second threshold value in time domain within the same LBT subband, and/or, the RO resource and the PO resource are located in the different LBT subband.

In an embodiment of the present disclosure, the first configured/predefined uplink CAPC is less than the second configured/predefined uplink CAPC.

In an embodiment of the present disclosure, the second configured/predefined uplink CAPC is determined based on the service trigger PRACH transmission.

In an embodiment of the present disclosure, the second threshold value is determined by at least one of the following: the symbol length of the RO resource, the symbol length of PO resource, the MCOT corresponding to the configured/predefined uplink CAPC.

In an embodiment of the present disclosure, the second threshold value equals to the MCOT minus the symbol length of the RO resource and the symbol length of PO resource.

In an embodiment of the present disclosure, the determining unit 1102 is further configured to determine the type of channel access procedure for the first transmission in the 2-step RACH procedure according to the relations between the RO resource and the PO resource and whether the PO resource is within the network device's COT.

In an embodiment of the present disclosure, the determining unit 1102 is further configured to determine the Type 2 channel access procedure for transmissions on the PO resource if the PO resource is within the network device's COT, when the RO resource and the PO resource are separated by a gap of less than or equal to a first duration in time domain within the same LBT subband.

In an embodiment of the present disclosure, the determining unit 1102 is further configured to determine the Type 2C channel access procedure for transmissions on the PO resource if the PO resource is within the network device's COT, when the RO resource and the PO resource are separated by a gap of less than or equal to the first duration in time domain within the same LBT subband.

In an embodiment of the present disclosure, the determining unit 1102 is further configured to determine the Type 2 channel access procedure for transmissions on the PO resource if the PO resource is within the network device's COT, when the RO resource and the PO resource are separated by a gap of more than or equal to a first duration but less than a second duration in time domain within the same LBT subband.

In an embodiment of the present disclosure, the determining unit 1102 is further configured to determine the Type 2B channel access procedure for transmissions on the PO resource if the PO resource is within the network device's COT, when the RO resource and the PO resource are separated by a gap of more than or equal to the first duration but less than the second duration in time domain within the same LBT subband.

In an embodiment of the present disclosure, the determining unit 1102 is further configured to determine the Type 2 channel access procedure for transmissions on the PO resource if the PO resource is within the network device's COT, when the RO resource and the PO resource are separated by a gap of more than or equal to a second duration but less than or equal to a first threshold value in time domain within the same LBT subband.

In an embodiment of the present disclosure, the determining unit 1102 is further configured to determine the Type 2A channel access procedure for transmissions on the PO resource if the PO resource is within the network device's COT, when the RO resource and the PO resource are separated by a gap of more than or equal to the second duration but less than or equal to the first threshold value in time domain within the same LBT subband.

Figure 14:
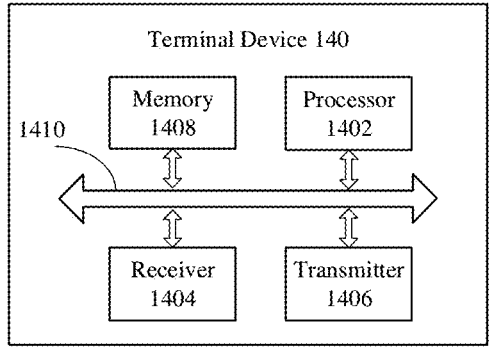
FIG. 14 schematically illustrates a terminal device according to an embodiment of the present disclosure.

It is important to note that, in the embodiment of the disclosure, the obtaining unit 1101 and the determining unit 1102 may be implemented by a processor (e.g. the processor 1402 in FIG. 14), and the transmitting unit 1103 may be implemented by a transmitter (e.g. the transmitter 1406 in FIG. 14).

Figure 12:
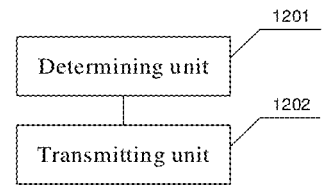
FIG. 12 schematically illustrates a terminal according to another embodiment of the present disclosure.

FIG. 12 schematically illustrates a terminal according to another embodiment of the present disclosure. The terminal may be a UE in NR system operating in unlicensed spectrum. Referring to FIG. 12, the terminal 120 comprises: a determining unit 1201 and a transmitting unit 1202.

The determining unit 1201 is configured to determine a type of channel access procedure for a first message transmission to the network device in a 2-step RACH procedure according to whether the RO resource and/or the PO resource are within a network device's COT.

The first message includes a PRACH transmission and a PUSCH transmission.

The transmitting unit 1202 is configured to transmit the first message to the network device using the determined type of channel access procedure.

In an embodiment of the present disclosure, the determining unit 1201 is further configured to determine the Type 2 channel access procedure for transmissions on the RO resource and/or the PO resource if the RO resource and/or the PO resource are within the network device's COT.

In an embodiment of the present disclosure, the determining unit 1201 is further configured to determine the Type 2C channel access procedure for transmissions on the RO resource and/or the PO resource if the gap between the starting point of the RO resource and the ending point of the previous transmission is less than a first duration.

In an embodiment of the present disclosure, the determining unit 1201 is further configured to determine the Type 2B channel access procedure for transmissions on the RO resource and/or the PO resource if the gap between the starting point of the RO resource and the ending point of the previous transmission is more than or equal to a first duration but less than a second duration.

In an embodiment of the present disclosure, the determining unit 1201 is further configured to determine the Type 2A channel access procedure for transmissions on the RO resource and/or the PO resource if the gap between the starting point of the RO resource and the ending point of the previous transmission is more than or equal to a second duration.

In an embodiment of the present disclosure, the terminal 120 further comprises: an obtaining unit is configured to obtain RO resource and PO resource. And the determining unit 1201 is further configured to determine the type of channel access procedure for the first transmission in the 2-step RACH procedure according to the relations between the RO resource and the PO resource and whether the PO resource is within the network device's COT.

In an embodiment of the present disclosure, the determining unit 120 is further configured to determine the Type 2 channel access procedure for transmissions on the PO resource if the PO resource is within the network device's COT, when the RO resource and the PO resource are separated by a gap of less than or equal to a first duration in time domain within the same LBT subband.

In an embodiment of the present disclosure, the determining unit 120 is further configured to determine the Type 2C channel access procedure for transmissions on the PO resource if the PO resource is within the network device's COT, when the RO resource and the PO resource are separated by a gap of less than or equal to the first duration in time domain within the same LBT subband.

In an embodiment of the present disclosure, the determining unit 120 is further configured to determine the Type 2 channel access procedure for transmissions on the PO resource if the PO resource is within the network device's COT, when the RO resource and the PO resource are separated by a gap of more than or equal to a first duration but less than a second duration in time domain within the same LBT subband.

In an embodiment of the present disclosure, the determining unit 120 is further configured to determine the Type 2B channel access procedure for transmissions on the PO resource if the PO resource is within the network device's COT, when the RO resource and the PO resource are separated by a gap of more than or equal to the first duration but less than the second duration in time domain within the same LBT subband.

In an embodiment of the present disclosure, the determining unit 120 is further configured to determine the Type 2 channel access procedure for transmissions on the PO resource if the PO resource is within the network device's COT, when the RO resource and the PO resource are separated by a gap of more than or equal to a second duration but less than or equal to a first threshold value in time domain within the same LBT subband.

In an embodiment of the present disclosure, the determining unit 120 is further configured to determine the Type 2A channel access procedure for transmissions on the PO resource if the PO resource is within the network device's COT, when the RO resource and the PO resource are separated by a gap of more than or equal to the second duration but less than or equal to the first threshold value in time domain within the same LBT subband.

It is important to note that, in the embodiment of the disclosure, the determining unit 1201 may be implemented by a processor (e.g. the processor 1402 in FIG. 14), and the transmitting unit 1202 may be implemented by a transmitter (e.g. the transmitter 1406 in FIG. 14).

Figure 13:
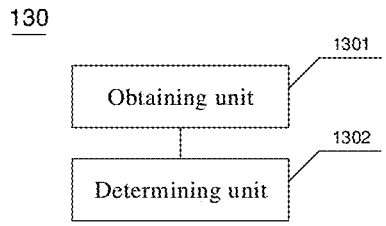
FIG. 13 schematically illustrates a terminal according to another embodiment of the present disclosure.

FIG. 13 schematically illustrates a terminal according to another embodiment of the present disclosure. The terminal may be a UE in NR system operating in unlicensed spectrum.

Referring to FIG. 13, the terminal 130 comprises: an obtaining unit 1301 and a determining unit 1302.

The obtaining unit 1301 is configured to obtain a RO resource for PRACH transmission and a PO resource for Msg A PUSCH transmission on a channel.

The determining unit 1302 is configured to determine a first channel access procedure for PRACH transmission and a second channel access procedure for Msg A PUSCH transmission.

Wherein the first channel access procedure comprises: a channel access procedure to initiate a first COT; or, a channel access procedure to share a second COT initiated by a network device, if the RO resource is within the second COT.

For example, the channel access procedure to initiate a COT may be Type 1 channel access procedure as above-mentioned. And the channel access procedure to share a COT initiated by a network device may be Type 2 channel access procedure as above-mentioned.

In an embodiment of the present disclosure, the first channel access procedure comprises Type 1 channel access procedure with a first UL CAPC p1 to initiate the first COT.

In an embodiment of the present disclosure, the first UL CAPC p1=1.

In an embodiment of the present disclosure, the first channel access procedure comprises Type 2A channel access procedure to share the second COT initiated by the network device, if the RO resource is within the second COT.

In an embodiment of the present disclosure, the second channel access procedure comprises Type 1 channel access procedure with a second UL CAPC p2, if the RO resource and the PO resource are within a same LBT subband of the channel in frequency domain and a time duration between the RO resource and the PO resource is more than or equal to a first value, or the RO resource and the PO resource are within different LBT subbands of the channel in frequency domain.

As an example, the first value is 25 us.

In an embodiment of the present disclosure, the second UL CAPC p2=1, or the second UL CAPC p2 is determined according to the service associated with the Msg A.

In an embodiment of the present disclosure, the second channel access procedure comprises Type 2A channel access procedure to share the second COT initiated by the network device, if the PO resource is within the second COT.

In an embodiment of the present disclosure, the first channel access procedure comprises a channel access procedure to initiate a first COT, and the second channel access procedure comprises a channel access procedure to share the first COT initiated by the terminal device, if the PO resource is within the first COT.

In an embodiment of the present disclosure, the PO resource is within the first COT, comprises: the RO resource and the PO resource are within the maximum channel occupancy time (MCOT) corresponding to the first COT.

In an embodiment of the present disclosure, the second channel access procedure comprises Type 2A channel access procedure, if the RO resource and the PO resource are within a same LBT subband of the channel in frequency domain and a time duration between the RO resource and the PO resource is more than or equal to a second value.

As an example, the second value is 25 us.

In an embodiment of the present disclosure, the second channel access procedure comprises Type 2B channel access procedure, if the RO resource and the PO resource are within a same LBT subband of the channel in frequency domain and a time duration between the RO resource and the PO resource is more than or equal to a third value and less than a second value.

As an example, the third value is 16 us.

In an embodiment of the present disclosure, the second channel access procedure comprises Type 2C channel access procedure, if the RO resource and the PO resource are within a same LBT subband of the channel in frequency domain and a time duration between the RO resource and the PO resource is less than or equal to a third value.

In an embodiment of the present disclosure, the terminal 130 is configured with dynamic channel access; or the terminal device is not configured with semi-static channel access.

In an embodiment of the present disclosure, the first channel access procedure comprises the channel access procedure to initiate the first COT, if the RO resource is configured from the beginning of the first COT, wherein the first COT corresponds to a first periodic channel occupancy on the channel, and the first periodic channel occupancy is configured to be initiated by the terminal device.

In an embodiment of the present disclosure, the first channel access procedure comprises the channel access procedure to share the second COT initiated by the network device, if the RO resource is within the second COT, wherein the second COT corresponds to a second periodic channel occupancy on the channel, and the second periodic channel occupancy is configured to be initiated by the network device.

In an embodiment of the present disclosure, the second channel access procedure comprises a channel access procedure to initiate a third COT, if the PO resource is configured from the beginning of the third COT, wherein the third COT corresponds to a third periodic channel occupancy on the channel, and the third periodic channel occupancy is configured to be initiated by the terminal device.

In an embodiment of the present disclosure, the second channel access procedure comprises the channel access procedure to share the second COT initiated by the network device, if the PO resource is within the second COT, wherein the second COT corresponds to a second periodic channel occupancy on the channel, and the second periodic channel occupancy is configured to be initiated by the network device.

In an embodiment of the present disclosure, the second channel access procedure comprises a channel access procedure to share the first COT initiated by the terminal device, if the PO resource is within the first COT, wherein the first COT corresponds to a first periodic channel occupancy on the channel which is initiated by the terminal device.

In an embodiment of the present disclosure, the first or second channel access procedure to initiate a COT, comprises: sensing the channel, by the terminal device, for at least a sensing slot duration of a fourth value; performing transmission, by the terminal device, immediately after sensing the channel to be idle; or not performing transmission, by the terminal device, if the channel is sensed to be busy.

As an example, the fourth value is 9 us.

In an embodiment of the present disclosure, the first or second channel access procedure to initiate the COT corresponds to a first energy detection threshold.

In an embodiment of the present disclosure, the first or second channel access procedure to share a COT, comprises: sensing the channel, by the terminal device, for at least a sensing slot duration of a fifth value; performing uplink transmission, by the terminal device, immediately after sensing the channel to be idle; or not performing the uplink transmission, by the terminal device, if the channel is sensed to be busy, wherein the uplink transmission comprises PRACH transmission and/or Msg A PUSCH transmission.

As an example, the fifth value is 9 us, or the fifth value is 9 us and the 9 us is within a 25 us interval ending immediately before transmission.

In an embodiment of the present disclosure, a time duration between the uplink transmission and the previous transmission within the same COT is more than or equal to a sixth value.

As an example, the sixth value is 16 us.

In an embodiment of the present disclosure, the first or second channel access procedure to share the COT corresponds to a second energy detection threshold.

In an embodiment of the present disclosure, the first energy detection threshold and the second energy detection threshold are independently configured.

In an embodiment of the present disclosure, the first or second channel access procedure to share a COT, comprises: performing uplink transmission, by the terminal device, without sensing the channel, wherein the uplink transmission comprises PRACH transmission and/or Msg A PUSCH transmission.

In an embodiment of the present disclosure, a time duration between the uplink transmission and the previous transmission within the same COT is less than or equal to a sixth value.

In an embodiment of the present disclosure, the determining unit 1302 is further configured to determine the first channel access procedure comprises either the channel access procedure to initiate the first COT or the channel access procedure to share a second COT according to a configuration from the network or a predefined rule.

In an embodiment of the present disclosure, the RO resource and the PO resource are within a same LBT subband of the channel in frequency domain.

In an embodiment of the present disclosure, the terminal device is configured with semi-static channel access.

It is important to note that, in the embodiment of the disclosure, the obtaining unit 1301 and the determining unit 1302 may be implemented by a processor (e.g., the processor 1402 in FIG. 14).

FIG. 14 schematically illustrates a terminal device according to an embodiment of the present disclosure.

As illustrated in FIG. 14, a terminal device 140 may include a processor 1402, a receiver 1404, a transmitter 1406 and a memory 1408, wherein the memory 1408 may be configured to store a code executed by the processor 1402, and the like.

Each component in the terminal device 140 is coupled together through a bus system 1110, wherein the bus system 1010 includes a data bus, and further includes a power bus, a control bus and a state signal bus.

The processor 1402 typically controls overall operations of the terminal device 140, such as the operations associated with display, data communications and recording operations. The processor 1402 may include one or more processors to execute codes in the memory 1408. Optionally, when the codes are executed, the processor 1402 implements the method performed by the terminal in the method embodiment, which will not be repeated here for brevity. Moreover, the processor 1402 may include one or more modules which facilitate the interaction between the processor 1402 and other components.

The memory 1408 is configured to store various types of data to support the operation of the terminal device 140. Examples of such data include instructions for any applications or methods operated on the terminal device 140, contact data, phonebook data, messages, pictures, video, etc. The memory 1408 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory or a magnetic or optical disk.

The receiver 1404 is configured to receive an electromagnetic signal received by the antenna. The main function of the receiver is to select the frequency components it needs from the numerous electromagnetic waves existing in the air, suppress or filter out unwanted signals or noise and interference signals, and then obtain the original useful information after amplification and demodulation.

The transmitter 1406 is configured to generate and modulate the RF current and transmit the radio waves through the antenna.

In embodiments of the present disclosure, the transmitter 1406 and receiver 1404 may be implemented as a transceiver.

The terminal 110 illustrated in FIG. 11, the terminal 140 illustrated in FIG. 14, the terminal 130 illustrated in FIG. 13 and the terminal 140 illustrated in FIG. 14 may implement each process implanted by the terminal in the abovementioned method embodiments and will not be elaborated herein to avoid repetitions.

Exemplary embodiments have been specifically shown and described as above. It will be appreciated by those skilled in the art that the disclosure is not limited the disclosed embodiments; rather, all suitable modifications and equivalent which come within the spirit and scope of the appended claims are intended to fall within the scope of the disclosure.

What is claimed is:

1. A method of accessing to a channel in shared spectrum, comprising:
   obtaining, by a terminal device, a random access channel (RACH) occasion (RO) resource for physical random access channel (PRACH) transmission and a physical uplink shared channel (PUSCH) occasion (PO) resource for Message A (Msg A) PUSCH transmission on the channel; and
   determining, by the terminal device, a first channel access procedure for PRACH transmission and a second channel access procedure for Msg A PUSCH transmission,
   wherein the first channel access procedure comprises:
      a channel access procedure to initiate a first channel occupancy time (COT); or,
      a channel access procedure to share a second COT initiated by a network device, if the RO resource is within the second COT,
   wherein the second channel access procedure comprises a channel access procedure to share the first COT initiated by the terminal device, if the PO resource is within the first COT, and
   wherein that the PO resource is within the first COT comprises:
      the RO resource and the PO resource are within the maximum channel occupancy time (MCOT) corresponding to the first COT.

2. The method according to claim 1, wherein the first channel access procedure comprises Type 1 channel access procedure with a first uplink channel access priority class (UL CAPC) p1 to initiate the first COT.

3. The method according to claim 2, wherein the first UL CAPC p1=1.

4. The method according to claim 1, wherein the first channel access procedure comprises Type 2A channel access procedure to share the second COT initiated by the network device, if the RO resource is within the second COT.

5. The method according to claim 1, wherein the second channel access procedure comprises Type 1 channel access procedure with a second UL CAPC p2, if the RO resource and the PO resource are within a same LBT subband of the channel in frequency domain and a time duration between the RO resource and the PO resource is more than or equal to a first value, or the RO resource and the PO resource are within different LBT subbands of the channel in frequency domain.

6. The method according to claim 5, wherein the second UL CAPC p2=1, or the second UL CAPC p2 is determined according to the service associated with the Msg A.

7. The method according to claim 1, wherein the second channel access procedure comprises Type 2A channel access procedure to share the second COT, if the PO resource is within the second COT.

8. The method according to claim 1, wherein the second channel access procedure comprises Type 2A channel access procedure, if the RO resource and the PO resource are within a same LBT subband of the channel in frequency domain and a time duration between the RO resource and the PO resource is more than or equal to a second value,
   wherein the second channel access procedure comprises Type 2B channel access procedure, if the RO resource and the PO resource are within a same LBT subband of the channel in frequency domain and a time duration between the RO resource and the PO resource is more than or equal to a third value and less than a second value, or
   wherein the second channel access procedure comprises Type 2C channel access procedure, if the RO resource and the PO resource are within a same LBT subband of the channel in frequency domain and a time duration between the RO resource and the PO resource is less than or equal to a third value.

9. The method according to claim 1, wherein the first channel access procedure comprises the channel access procedure to initiate the first COT, if the RO resource is configured from the beginning of the first COT, wherein the first COT corresponds to a first periodic channel occupancy on the channel, and the first periodic channel occupancy is configured to be initiated by the terminal device, or
   wherein the first channel access procedure comprises the channel access procedure to share the second COT initiated by the network device, if the RO resource is within the second COT, wherein the second COT corresponds to a second periodic channel occupancy on the channel, and the second periodic channel occupancy is configured to be initiated by the network device.

10. The method according to claim 9, wherein the first or second channel access procedure to initiate a COT, comprises:
    sensing the channel, by the terminal device, for at least a sensing slot duration of a fourth value; and
    performing transmission, by the terminal device, immediately after sensing the channel to be idle; or not performing transmission, by the terminal device, if the channel is sensed to be busy.

11. The method according to claim 9, wherein the first or second channel access procedure to share a COT, comprises:
    sensing the channel, by the terminal device, for at least a sensing slot duration of a fifth value; and
    performing uplink transmission, by the terminal device, immediately after sensing the channel to be idle; or not performing the uplink transmission, by the terminal device, if the channel is sensed to be busy, wherein the uplink transmission comprises PRACH transmission and/or Msg A PUSCH transmission.

12. The method according to claim 11, wherein a time duration between the uplink transmission and the previous transmission within the same COT is more than or equal to a sixth value.

13. The method according to claim 9, wherein the first or second channel access procedure to share a COT, comprises:
    performing uplink transmission, by the terminal device, without sensing the channel, wherein the uplink transmission comprises PRACH transmission and/or Msg A PUSCH transmission.

14. The method according to claim 13, wherein a time duration between the uplink transmission and the previous transmission within the same COT is less than or equal to a sixth value.

15. The method according to claim 9, wherein the RO resource and the PO resource are within a same LBT subband of the channel in frequency domain.

16. The method according to claim 9, wherein the terminal device is configured with semi-static channel access.

17. The method according to claim 1, wherein the second channel access procedure comprises a channel access procedure to initiate a third COT, if the PO resource is configured from the beginning of the third COT, wherein the third COT corresponds to a third periodic channel occupancy on the channel, and the third periodic channel occupancy is configured to be initiated by the terminal device, or wherein the second channel access procedure comprises the channel access procedure to share the second COT initiated by the network device, if the PO resource is within the second COT, wherein the second COT corresponds to a second periodic channel occupancy on the channel, and the second periodic channel occupancy is configured to be initiated by the network device, or wherein the second channel access procedure comprises a channel access procedure to share the first COT initiated by the terminal device, if the PO resource is within the first COT, wherein the first COT corresponds to a first periodic channel occupancy on the channel, and the first periodic channel occupancy is configured to be initiated by the terminal device.

18. The method according to claim 1, further comprising:
determining, by the terminal device, the first channel access procedure comprises either the channel access procedure to initiate the first COT or the channel access procedure to share a second COT according to a configuration from the network or a predefined rule.

19. A terminal device, comprising:
a processor;
a memory configured to store instructions executable by the processor,
wherein the processor is configured to execute operations comprising:
obtaining a random access channel (RACH) occasion (RO) resource for physical random access channel (PRACH) transmission and a physical uplink shared channel (PUSCH) occasion (PO) resource for Message A (Msg A) PUSCH transmission on the channel; and
determining a first channel access procedure for PRACH transmission and a second channel access procedure for Msg A PUSCH transmission,
wherein the first channel access procedure comprises:
a channel access procedure to initiate a first channel occupancy time (COT); or,
a channel access procedure to share a second COT initiated by a network device, if the RO resource is within the second COT,
wherein the second channel access procedure comprises a channel access procedure to share the first COT initiated by the terminal device, if the PO resource is within the first COT, and
wherein that the PO resource is within the first COT comprises:
the RO resource and the PO resource are within the maximum channel occupancy time (MCOT) corresponding to the first COT.

\* \* \* \* \*